Patented Feb. 5, 1952

2,584,701

UNITED STATES PATENT OFFICE 2,584,701

SURFACE-ACTIVE COMPOUNDS

Ronald A. Henry, China Lake, Calif., assignor to The Procter & Gamble Company, a corporation of Ohio No Drawing. Application September 8, 1949,
Serial No. 114,680

10 Claims. (Cl. 260—400)

This invention relates to surface-active sulfonated compounds.

It is well known that surface-active properties, such as reduced surface tension and high sudsing, washing and wetting power, are possessed by high molecular compounds which possess both hydrophilic and lipophilic groups in proper balance, but some of these compounds are undesirably expensive while others, such as ordinary soap, are subject to the disadvantages that they are destroyed by acid or are grained out by strong salt solutions or are precipitated by alkaline earth or heavy metal salts such as are found in sea water and natural hard waters.

It is an object of this invention to provide new and inexpensive surface-active agents. Another object is to provide washing, sudsing and wetting agents which are effective in soft, hard or salt water and do not form curd therein, and which can also be used in dilute acid or alkaline solution. Other objects will appear in the description which follows:

I have discovered a new class of surface-active detergents which are substantially unaffected by hard water or salt water and which can be used even in dilute acids or alkalis. These surface-active agents are the products of sulfonating compounds of the general formula $$RCOXC_nH_{2n}COX'Y$$

where RCO represents acyl groups of substantially saturated fatty acids of about 8 to about 22 carbon atoms, $n$ is a small integer, usually from 1 to 3, X and X' are each either oxygen or N(Z), Z being either hydrogen or an alkyl radical of not more than 3 carbon atoms, and Y is a low molecular alkenyl radical, preferably of not less than 3 nor more than 4 carbon atoms. By an alkyl radical I mean herein a univalent radical derived from a saturated aliphatic hydrocarbon by removing one hydrogen atom therefrom, and thus having the general formula $$C_nH_{2n+1}$$

and by an alkenyl radical I mean a univalent radical derived in similar manner from an unsaturated aliphatic hydrocarbon having one double bond, the radical thus having the general formula $$C_nH_{2n-1}$$

The following specific examples illustrate compounds which after sulfonation are included within the scope of my invention.

| Compound | X | $C_nH_{2n}$ | X' | Y |
|---|---|---|---|---|
| RCOOCH$_2$COOCH$_2$CH=CH$_2$ | —O— | —CH$_2$— | —O— | —CH$_2$CH=CH$_2$ |
| RCOOCH$_2$CON(H)CH$_2$CH=CH$_2$ | —O— | —CH$_2$— | —NH— | —CH$_2$CH=CH$_2$ |
| RCON(H)CH$_2$COOCH$_2$CH=CH$_2$ | —NH— | —CH$_2$— | —O— | —CH$_2$CH=CH$_2$ |
| RCON(H)CH$_2$CON(H)CH$_2$CH=CH$_2$ | —NH— | —CH$_2$— | —NH— | —CH$_2$CH=CH$_2$ |
| RCOOCH$_2$CH$_2$COOCH$_2$CH=CH$_2$ | —O— | —CH$_2$CH$_2$— | —O— | —CH$_2$CH=CH$_2$ |
| RCOOCH$_2$CON(CH$_3$)CH$_2$CH=CH$_2$ | —O— | —CH$_2$— |  —N— CH$_3$ | —CH$_2$CH=CH$_2$ |
| RCOOCH$_2$CONHCH(CH$_3$)C=CH$_2$ | —O— | —CH$_2$— | —NH— | —CH$_2$C(CH$_3$)=CH$_2$ |
| RCOOCH$_2$COOCH$_2$CH=CHCH$_3$ | —O— | —CH$_2$— | —O— | —CH$_2$CH=CHCH$_3$ |
| RCOOCH$_2$COOCH$_2$CH$_2$CH=CH$_2$ | —O— | —CH$_2$— | —O— | —CH$_2$CH$_2$CH=CH$_2$ |
| RCOOCH$_2$COOCH(CH$_3$)CH=CH$_2$ | —O— | —CH$_2$— | —O— | —CH(CH$_3$)CH=CH$_2$ |
| RCON(C$_2$H$_5$)CH$_2$COOCH$_2$CH=CH$_2$ |  —N— C$_2$H$_5$ | —CH$_2$— | —O— | —CH$_2$CH=CH$_2$ |
| RCOOCH(CH$_3$)COOCH$_2$CH=CH$_2$ | —O— | —CH(CH$_3$)— | —O— | —CH$_2$CH=CH$_2$ |
| RCOOCH(CH$_3$)CH$_2$COOCH$_2$CH=CH$_2$ | —O— | —CH(CH$_3$)CH$_2$— | —O— | —CH$_2$CH=CH$_2$ |
| RCON(H)CH$_2$CH$_2$CH$_2$COOCH$_2$CH=CH$_2$ | —NH— | —CH$_2$CH$_2$CH$_2$— | —O— | —CH$_2$CH=CH$_2$ |

The sulfonated compounds of my invention include both long chain fatty acid esters and amides, and may be further subdivided into diesters, diamides, ester-amides and amide-esters.

will be understood that when I speak of "sulfonated compounds" I use the term broadly to mean the products obtained by treating these unsaturated esters or amides with strong sulfonating agents such for example as sulfuric acid, fuming sulfuric acid, sulfur trioxide, chlorsulfonic acid, and the like, and I do not attempt to define the chemical structure of the resulting sulfonated products because I am not in all cases sure of their structure. In some cases they appear to be true sulfonates, i. e. having direct carbon-to-sulfur linkage, while in other cases sulfuric esters appear to be present, in which carbon is joined to sulfur through an atom of oxygen. The attack of the sulfonating agent is believed to be at the olefinic bond in the alkenyl radical represented by Y in the generic formula. It may result in reactions such as these:

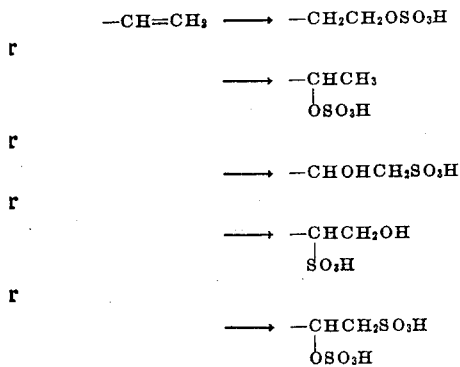

It will be perceived that in the chemical formulae proposed the hydrophilic portion is situated at the end of a long molecule, the other end of which is lipophilic in nature, and this is believed to be the requirement for pronounced surface activity. However, the utility of these compounds is in their proven surface activity, and is not inherent in any particular speculative chemical structure which may be proposed as the result of the sulfonation process.

The esters and amides of my invention can be prepared in a plurality of ways, some of which will be described. I can, for example, start with an aliphatic monohydroxy monocarboxylic acid, such for example as glycollic acid or a lactic acid or a hydroxy butyric acid, which can be esterified in conventional manner with an olefinic monohydric aliphatic alcohol of three or four carbon atoms, such for example as allyl, methallyl or crotyl alcohol, 3-buten-1-ol, 3-buten-2-ol and the like. The resulting hydroxy ester is then acylated in conventional manner, as for example by treatment with an acid chloride, to form a diester. Such reactions may be represented thus:

(1) $HOCH_2COOH + HOCH_2CH=CH_2 \rightarrow$
$HOCH_2COOCH_2CH=CH_2 + H_2O$
(2) $RCOCl + HOCH_2COOCH_2CH=CH_2 \rightarrow$
$RCOOCH_2COOCH_2CH=CH_2 + HCl$ Similarly, the amide of an aliphatic monohydroxy monocarboxylic acid, such as the acids described in the preceding paragraph, can be formed in conventional manner, as for example by reaction of the methyl ester of the acid with an aliphatic primary or secondary amine, one of the valence bonds of the nitrogen of which is satisfied by an alkenyl group of 3 or 4 carbon atoms such as those of the alcohols mentioned in the preceding paragraph. The resulting hydroxy amide is then acylated in conventional manner to form an ester-amide. Such reactions may be represented thus:

(1) $HOCH_2COOCH_3 + H_2NCH_2CH=CH_2 \rightarrow$
$HOCH_2CONHCH_2CH=CH_2 + CH_3OH$
(2) $HOCH_2CONHCH_2CH=CH_2 + RCOCl \rightarrow$
$RCOOCH_2CONHCH_2CH=CH_2 + HCl$ Diamides can be made by amidifying a low molecular ester of an amino acid by treating it with a fatty acid chloride; the resulting amide ester is then heated with an unsaturated primary amine to form the desired unsaturated diamide. Such reactions can be represented thus:

(1) $RCOCl + H_2NCH_2COOCH_3 \rightarrow$
$RCONHCH_2COOCH_3 + HCl$
(2) $RCONHCH_2COOCH_3 + H_2NCH_2CH=CH_2 \rightarrow$
$RCONHCH_2CONHCH_2CH=CH_2 + CH_3OH$ In generally similar manner, amide-esters can be made by treating an amino acid with a fatty acid chloride to amidify the amino acid, and then esterifying with an unsaturated alcohol. Thus:

(1) $RCOCl + H_2NCH_2COOH \rightarrow$
$RCONHCH_2COOH + HCl$
(2) $RCONHCH_2COOH + HOCH_2CH=CH_2 \rightarrow$
$RCONHCH_2COOCH_2CH=CH_2 + H_2O$ The following examples, in which all parts are by weight, illustrate the invention, but it is to be understood that they are illustrative only and that the invention is not limited thereby but only by the terms of the appended claims.

Example 1.—Allyl glycollate was prepared by mixing 94.5 parts of crystallized glycollic acid, 360 parts of allyl alcohol and 130 parts of benzene, adding 2 parts of p-toluene sulfonic acid as catalyst, and boiling under reflux condenser for 10 hours. The solution was then adjusted (by means of caustic soda and acid additions) until just colorless to phenolphthalein, and was distilled under 48–50 mm. of mercury pressure. Most of the product distilled between 100° and 104° C. and was collected separately, the yield of distillate being 72% of that calculated as theoretically possible.

Allyl lauroyl glycollate was prepared by adding 85.8 parts of lauroyl chloride dissolved in 101 parts of diethyl ether to 50 parts of the above allyl glycollate dissolved in 99 parts of ether and 101 parts of pyridine. The addition was slow, 38 minutes being required, during which time the temperature was maintained at 5–10° C. by external cooling. Stirring was continued for 2 hours at below 10° C. and thereafter the temperature was allowed to rise to room temperature and stirring was continued for another 2 hours. Pyridine was then removed by washing successively with water and 5% hydrochloric acid. Washing was then continued with water, with 1% sodium carbonate solution, and finally with water again until again neutral. The product was then dried over anhydrous sodium sulfate and fractionally distilled between 135° and 164° C. at about 3 mm. pressure. The weight of distillate indicated a yield of 77% of theoretical. Ester value and iodine value were respectively 367 and 85.7, as against theoretical values of 377 and 85.

Allyl lauroyl glycollate was next sulfonated by adding simultaneously and at approximately equivalent rates (a) 30 parts of oleum containing 59% free sulfur trioxide and (b) a solution of 30 parts of the above allyl lauroyl glycollate in 10 parts of ethylene dichloride to (c) 16.4 parts of ethylene dichloride, with stirring and with external cooling to keep the temperature below 40° C. The addition required about 10 minutes. Seventy-six parts of the viscous acid paste were poured into ice water and the mixture was neutralized below 50° C. by adding 28% sodium hydroxide solution thereto slowly, with stirring, so that the pH of the solution never rose substantially above that of the methyl orange endpoint.

The neutralized mixture was then extracted with petroleum ether to remove both unsulfonated organic matter and ethylene dichloride. To the sulfonated product thus purified, 10 parts of sodium sulfate and 1.5 parts of disodium hydrogen orthophosphate were added, and this mixture was adjusted to pH 7 and was roll dried. The dried product was surface-active and possessed marked sudsing and washing power in both medium and hard water, i. e. water of 7 grains per gallon and 21 grains per gallon, forming no curd therein at any concentration.

Analysis of the alcohol-soluble portion of the dried product indicated that it was approximately half monosulfonate and half a sulfate-sulfonate, as may be seen from these figures:

| Composition | Per Cent Ester $SO_3$ [1] | Per Cent Total $SO_3$ |
|---|---|---|
| $C_{11}H_{23}COOCH_2COOCH_2CHOHCH_2SO_3Na$ | 0 (Calc.) | 19.1 (Calc.). |
| $C_{11}H_{23}COOCH_2COOCH_2CHOSO_3NaCH_2SO_3Na$ | 15.35 (Calc.) | 30.7 (Calc.). |
| Sulfonation Product of Example 1 | 7.1 (Found) | 25.25 (Found). |

[1] This is the $SO_3$ determined by acid hydrolysis.

*Example 2.*—N-allyl hydroxyacetamide was prepared by dissolving 90.1 parts of methyl hydroxyacetate in 50 parts of methyl alcohol, likewise dissolving 60 parts of allylamine in 50 parts of methyl alcohol, and adding the latter solution slowly to the former while keeping the temperature below 40° C. The amount of amine was 105% of the amount theoretically required to react with the methyl hydroxyacetate. The mixture was then boiled for 1 hour under reflux condenser, and was evaporated to constant weight, the yield being 114.4 parts, as against a theoretical yield of 115.1 parts. The resulting viscous liquid contained 11.4% nitrogen and had an iodine value of 207.9, compared with theoretical values of 12.2 and 200 respectively.

The allyl amide of lauroyl glycollic acid was prepared by adding 109 parts of lauroyl chloride to a solution of 55 parts of the above N-allyl hydroxyacetamide in 100 parts of benzene and 70 parts of pyridine. This addition required 1⅓ hours, during which time the mixture was stirred and cooled to between 5° and 10° C. The mixture was gradually warmed, then heated at 50–60° C. for 1 hour. After cooling it was washed successively with water, 5% hydrochloric acid and 1% sodium carbonate solution and was dried over sodium sulfate. Volatile solvent was removed by heating. The yield was 85% of theoretical. The ester value and the iodine value were respectively 91% and 92% of theoretical.

The above allyl amide of lauroyl glycollic acid was sulfonated by adding simultaneous and roughly equivalent streams of (a) technical 65% oleum containing 60% free sulfur trioxide by weight, the total amount of oleum being 47.5 parts, and (b) a solution of 50 parts of the above allyl amide of lauroyl glycollic acid in 80 parts of ethylene dichloride to (c) a vessel containing 25.7 parts of ethylene dichloride. During the mixing, which required about 15 minutes, agitation was good and external cooling was employed, but the mixture became very viscous and the temperature rose to 35–40° C.

The viscous acid paste was neutralized and extracted with petroleum ether as in Example 1. The product possessed marked wetting, sudsing and washing properties in medium hard and hard water, i. e. water of 7 and 21 grains per gallon, forming no curd therein at any concentration.

Analysis of the alcohol-soluble portion of the product indicates that it was approximately one half monosulfonate and one half a sulfate-sulfonate, as may be seen from these figures:

| Composition | Per Cent Ester $SO_3$ [1] | Per Cent Total $SO_3$ |
|---|---|---|
| $C_{11}H_{23}COOCH_2CONHCH_2CHOHCH_2SO_3Na$ | 0 (Calc.) | 19.2 (Calc.). |
| $C_{11}H_{23}COOCH_2CONHCH_2CHOSO_3NaCH_2SO_3Na$ | 15.4 (Calc.) | 30.8 (Calc.). |
| Sulfonation Product of Example 2 | 7.5 (Found) | 24.3 (Found). |

[1] This is the $SO_3$ determined by acid hydrolysis.

*Example 3.*—N-methallyl hydroxy acetamide was prepared by refluxing for 1 hour a mixture of 78 parts (110% of the theoretically required amount) of methallyl amine, 90.1 parts of methyl hydroxyacetate and 50 parts of methyl alcohol. Sixty-two parts of this N-methallyl hydroxyacetamide were then dissolved in 70 parts of pyridine and 100 parts of benzene, the solution was cooled to 5° C., and 109 parts of lauroyl chloride were added thereto gradually in an hour's time, keeping the temperature at 5–10° C. The mixture was heated to 50–60° C. for 1 hour and was washed successively with water, 5% hydrochloric acid, water, and 1% sodium carbonate. It was then dried over $Na_2SO_4$ and the solvent was evaporated.

50.5 parts of the above methallyl amide of lauroyl glycollic acid dissolved in 158 parts of ethylene dichloride were sulfonated by adding 45 parts of technical 60% oleum thereto while keeping the temperature between 35° and 45° C. Two hundred forty-two parts of the viscous acid paste were neutralized as in Example 1 and unsulfonated organic matter was removed by extraction with petroleum ether.

To the thus-purified sulfonation product, 30 parts of sodium sulfate and 3 parts of disodium hydrogen orthophosphate were added, and this mixture was adjusted to pH 7 and was roll dried. The resulting product possessed excellent wetting, sudsing and washing power in both medium hard and hard water, i. e. water of 7 and of 21 grains per gallon, and formed no curd therein at any dilution. The total $SO_3$ content of the alcohol-soluble portion of the product was 24.2%, which is good agreement with the corresponding values found in Examples 1 and 2.

In preparing the products herein contemplated, having the formula $$RCOXC_nH_{2n}COX'Y$$

the acyl groups represented by RCO should preferably be those of substantially saturated high molecular soap-forming fatty acids, by which I mean those of from about 8 to about 22 carbon atoms. Especially valuable products are obtained when the fatty acids are chiefly lauric or myristic or the fatty acids from an oil of the coconut oil group by which term I means to designate all vegetable seed oils or fats at least 50 per cent by weight of the combined fatty acids of which are lauric and/or myristic acids. These oils (many examples of which are given in Hilditch's "The Chemical Constitution of Natural Fats," second edition (1947), pages 198–205) are commonly derived from seed of members of the botanical families Lauraceae (tangkallak kernel oil for example), Myristicaceae (ucuhuba nut oil for example), Simaroubaceae (dika nut oil for example), Salvadoraceae (Khakan kernel oil for example), and more especially the Palmae family. Coconut oil is the outstanding example of an oil derived from seed of the Palmae family, but other non-limiting examples of such oils are oils of murumuru kernel, tucuma kernel, cohune nut, uricoury nut, babassu kernel and palm kernel. While the small amounts of unsaturated acids present in the mixed fatty acids of oils of the coconut oil group are not seriously objectionable, it is in general preferred that the fatty acids be derived from oils or fats having an iodine value not substantially more than 20. Substantial absence of ethylenic double bonds in the compounds means fewer side reactions during sulfonation, so that the products obtained are as a rule of better color and are better sudsing, washing and wetting agents.

While the acyls represented by RCO are commonly those of fatty acids derived from animal or vegetable oils, fats and waxes (all of which for convenience I shall generically designate as "fats") of low iodine value or from those which have been fully or partially hydrogenated, catalytically rearranged and/or grained or otherwise treated to reduce their iodine value, synthetic fatty acids may also be used, such for example as those obtained by oxidizing petroleum hydrocarbons or by hydrogenating carbon monoxide (the so-called Fischer-Tropsch process) or indirectly by oxidizing the saturated or unsaturated hydrocarbons or oxygenated hydrocarbons resulting from this process.

The value of $n$ in the alkylene connecting link represented by $C_nH_{2n}$ in the generic formula of my compounds, and the number of carbon atoms in the alkenyl radical represented by Y are variable small quantities, interrelated and dependent also upon whether X and X' are oxygen, NH or N(alkyl), and in the case of N(alkyl), upon the length of the alkyl attached to the nitrogen. Wide choice is thus presented to one skilled in the art, and by combining these variables in suitable manner, compounds varying in solubility, surface activity and usefulness may be obtained, depending upon the specific materials which are available and the properties which are desired. Such choice is however subject to the limitation that the products be water-soluble and that when dissolved in water they possess surface-activity. This criterion is easily applied by one skilled in the art.

Sulfonation of the diesters, diamides, esteramides or amide-esters which have been described can be accomplished with strong sulfonating agents such for example as 98–100% sulfuric acid or sulfur trioxide. Fuming sulfuric acid (such for example as that containing about 55 to 60% free sulfur trioxide by weight) is especially suitable for the purpose since with it excessive splitting of the fatty acid ester or amide linkages does not occur nor are there excessive side reactions, the chief reaction being at the double bond of the alkenyl group represented by Y. In order to obtain good color and a high degree of completeness of sulfonation, temperatures above 60° C. should preferably be avoided during the reaction, and both agitation and temperature control should be efficient in order to prevent localized overheating at or near the point of contact of the sulfonating acid with the material to be sulfonated, and also to prevent localized excesses of the sulfonating acid.

Various organic solvents, diluents or thinning agents may be used advantageously during the sulfonation, such for example as dioxane, saturated aliphatic hydrocarbons, chlorinated hydrocarbons and low molecular esters. Such solvents, diluents or thinning agents are helpful in reducing the viscosity of the acid reaction mixture, thus making thorough and rapid mixing easier and preventing local excesses of sulfonating acid; they make the sulfonation less drastic and reduce side reactions, and they reduce the tendency of the sulfonating acid to split fatty acid ester and amide linkages. Specific examples of such thinning agents are hexane, heptane, carbon tetrachloride, and ethylenedichloride. Low-boiling saturated aliphatic esters, such for example as methyl and ethyl acetates, are especially effective in dissolving both the materials to be sulfonated and the sulfonated products in order to give homogeneous solutions, in reducing viscosity, in rendering the reaction less drastic, in reducing undesirable side reactions, preventing splitting of ester and amide linkages, improving color, etc. Thus while at least 1.5 times as much, and preferably twice as much, ethylene dichloride as of material to be sulfonated is required in order to give a mixture which is sufficiently thin to permit efficient stirring, ethyl acetate is effective when used with the material to be sulfonated in a weight ratio of only 1:1. Larger amounts of thinning agent are more effective but also more expensive.

For some purposes, the acid sulfonation mixture may be used without neutralization. More commonly, however, when the sulfonation reaction is complete the acid reaction mixture is neutralized, preferably at a low temperature not substantially above 50° C. When carboxylic ester groups are present, splitting of such groups can be largely avoided by neutralizing to a final pH (at 25° C.) of about 5 to 8. Any alkaline-reacting compound may be used for this purpose provided its salt with the sulfonic acid is water-soluble. Sodium hydroxide and its alkaline salts, ammonium hydroxide, various amines, quaternary ammonium bases, magnesium oxide or carbonate, etc. are illustrations of such neutralizing agents. To avoid splitting fatty ester or amide linkages, adding the alkali slowly to the acid mixture is required, as well as efficient mixing and cooling in order to insure against localized excess of alkali or localized high temperature at any point in the reaction mixture.

The sulfonation products of the invention may be treated in conventional manner to remove unsulfonated organic matter, inorganic salts, etc., or they may if desired be used without purifying. Conventional drying methods, such as drum drying, vacuum drum drying, spray drying and the like may also be applied if desired. The physical character of the product, whether it be in bar, flake, granule, powder, paste, liquid or other form, is not a limitation upon the invention. Furthermore, the product may if desired be used in conjunction with soap or with other anionic organic detergents (such for example as alkyl sulfates and sulfonates) or with non-ionic organic detergents (such for example as alkyl ethers of polyethyleneglycol or alkyl phenol ethers thereof or corresponding thioethers) or with inorganic salts (such for example as sodium sulfate, sodium chloride, sodium bicarbonate, mildly alkaline sodium silicate, sodium pyro-, tri-, tetra- or metaphosphates and the like) or with relatively unreactive organic compounds (such for example as fluorescing agents, carboxymethylcellulose, starch, urea, high molecular aliphatic alcohols, fatty acid monoglycerides, fatty acid amides and the like). In general, however, combinations of water, strong alkali and heating are to be avoided lest some splitting of the fatty ester or amide linkage take place. It is especially advisable that when the sulfonated products are being heated during drying, the pH be near 7 and the heating be as brief and to as low a temperature as possible.

Having thus described my invention, what I claim and desire to secure by Letters Patent is:

1. The mixture of surface-active material which is the sulfonation product of a compound of the formula $$RCOXC_nH_{2n}COX'Y$$

where RCO represents acyl radicals of substantially saturated fatty acids of about 8 to 22 carbon atoms, $n$ is a small integer, X and X' are selected from the group consisting of oxygen and N(Z), Z being a member of the group consisting of hydrogen and alkyl radicals of not more than 3 carbon atoms, and Y is a low molecular alkenyl radical, in which the carbon to carbon double bond occurs at least one carbon atom beyond the carbon atom to which X' is attached.

2. A mixture of water-soluble surface-active salts of the sulfonation products of a compound of the formula $$RCON(Z)C_nH_{2n}COXY$$

where RCO represents acyl radicals of substantially saturated fatty acids of about 8 to 22 carbon atoms, $n$ is an integer not less than 1 nor more than 3, X is a member of the group consisting of oxygen and N(Z'), Z and Z' being members of the group consisting of hydrogen and alkyl radicals of not more than 3 carbon atoms, and Y is an alkenyl radical of 3 to 4 carbon atoms in which the carbon to carbon double bond occurs at least one carbon atom beyond the carbon atom to which X is attached.

3. A mixture of water-soluble surface-active salts of the sulfonation products of a compound of the formula $$RCON(Z)C_nH_{2n}CON(Z')Y$$

where RCO represents acyl radicals of fatty acids of about 8 to about 22 carbon atoms derived from fats having an iodine value not substantially more than 20, $n$ is a small integer, Z and Z' are members of the group consisting of hydrogen and alkyl radicals of not more than 3 carbon atoms, and Y is an alkenyl radical of 3 to 4 carbon atoms in which the carbon to carbon double bond occurs at least one carbon atom beyond the carbon atom to which N(Z') group is attached.

4. A mixture of water-soluble surface-active salts of the sulfonation products of a compound of the formula $$RCOOC_nH_{2n}COOY$$

where RCO represents acyl radicals of fatty acids of about 8 to 22 carbon atoms derived from fats having an iodine value not substantially more than 20, $n$ is a small integer, and Y is an alkenyl radical of 3 to 4 carbon atoms in which the carto carbon double bond occurs at least one carbon atom beyond the carbon atom of said alkenyl radical that is attached to the carboxyl ester linkage.

5. A mixture of water-soluble surface-active salts of the sulfonation products of a compound of the formula $$RCOOC_nH_{2n}CON(Z)Y$$

where RCO represents acyl radicals of fatty acids of about 8 to 22 carbon atoms derived from fats having an iodine value not substantially more than 20, $n$ is a small integer, Z is a member of the group consisting of hydrogen and alkyl radicals of not more than 3 carbon atoms, and Y is an alkenyl radical of 3 to 4 carbon atoms in which the carbon to carbon double bond occurs at least one carbon atom beyond the carbon atom to which the N(Z) group is attached.

6. A mixture of water-soluble surface-active salts of the sulfonation products of a compound of the formula $$RCOXCH_2COX'CH_2CH=CH_2$$

where RCO represents acyl radicals of substantially saturated fatty acids of about 8 to 22 carbon atoms, and X and X' are selected from the group consisting of oxygen and N(Z), Z being a member of the group consisting of hydrogen and alkyl radicals of not more than 3 carbon atoms.

7. A mixture of water-soluble surface-active salts of the sulfonation products of a compound of the formula $$RCON(Z)CH_2COXCH_2CH=CH_2$$

where RCO represents acyl radicals of fatty acids of about 8 to 22 carbon atoms derived from fats having an iodine value not substantially more than 20, X is a member of the group consisting of oxygen and N(Z'), and Z and Z' are members of the group consisting of hydrogen and alkyl radicals of not more than 3 carbon atoms.

8. The mixture of sodium salts of the sulfonation products of a compound of the formula $$RCON(Z)CH_2CON(Z')CH_2CH=CH_2$$

where RCO represents acyl radicals of fatty acids derived from an oil of the coconut oil group, and Z and Z' are members of the group consisting of hydrogen and alkyl radicals of not more than 3 carbon atoms, said salt being soluble in water and having pronounced washing, sudsing and wetting power when in aqueous solution.

9. The mixture of sodium salts of the sulfonation products of a compound of the formula $$RCOOCH_2COOCH_2CH=CH_2$$

where RCO represents acyl radicals of fatty acids derived from an oil of the coconut oil group, said salt being soluble in water and having pronounced ashing, sudsing and wetting power when in aqueous solution.

10. The mixture of sodium salts of the sulfonation products of a compound of the formula

RCOOCH₂CON(Z)CH₂CH=CH₂ where RCO represents acyl radicals of fatty acids derived from an oil of the coconut oil group, and Z is a member of the group consisting of hydrogen and alkyl radicals of not more than 3 carbon atoms, said salt being soluble in water and having pronounced washing, sudsing and wetting power when in aqueous solution.

RONALD A. HENRY.

REFERENCES CITED

The following references are of record in the file of this patent:

UNITED STATES PATENTS

| Number | Name | Date |
| --- | --- | --- |
| 2,178,139 | Epstein | Oct. 31, 1939 |
| 2,184,770 | Katzman | Dec. 26, 1939 |
| 2,236,541 | Katzman | Apr. 1, 1941 |
| 2,259,466 | Harris | Oct. 21, 1941 |
| 2,259,602 | Baldwin | Oct. 21, 1941 |
| 2,391,830 | Jayne | Dec. 25, 1945 |